May 12, 1953 — J. B. PARSONS — 2,638,125
ELECTROMAGNETICALLY ACTUATED VALVE
Filed July 17, 1950 — 2 Sheets-Sheet 1
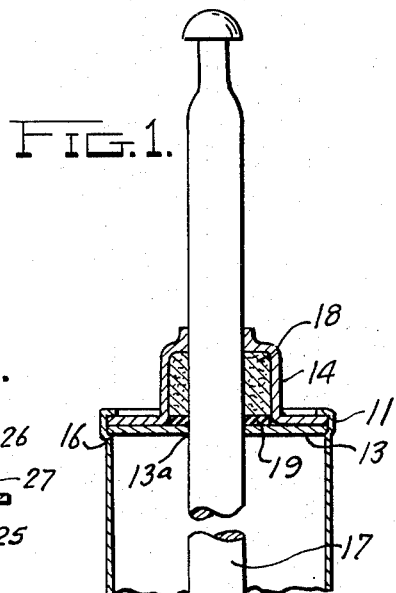
FIG. 1.
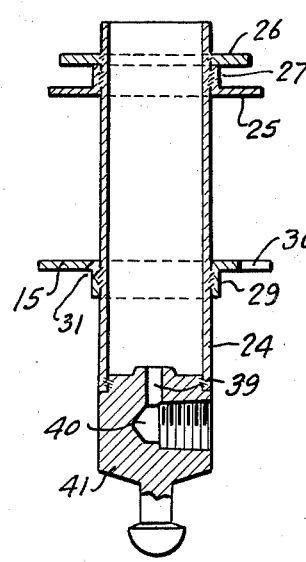
FIG. 2.
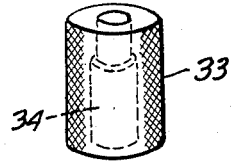
FIG. 4.
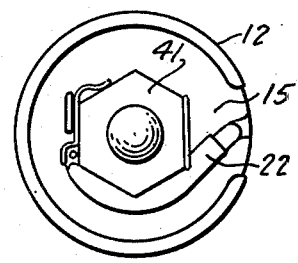
FIG. 5.
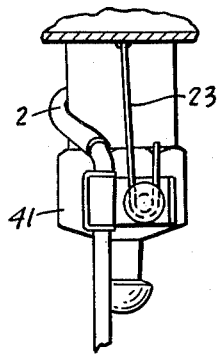
FIG. 3.
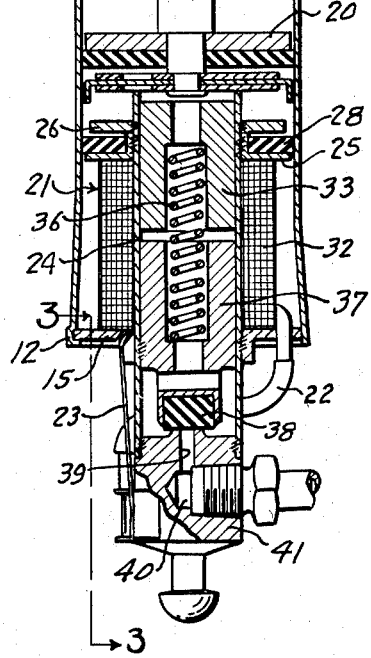
INVENTOR.
John B. Parsons
BY
ATTORNEY May 12, 1953 J. B. PARSONS 2,638,125
ELECTROMAGNETICALLY ACTUATED VALVE
Filed July 17, 1950 2 Sheets-Sheet 2
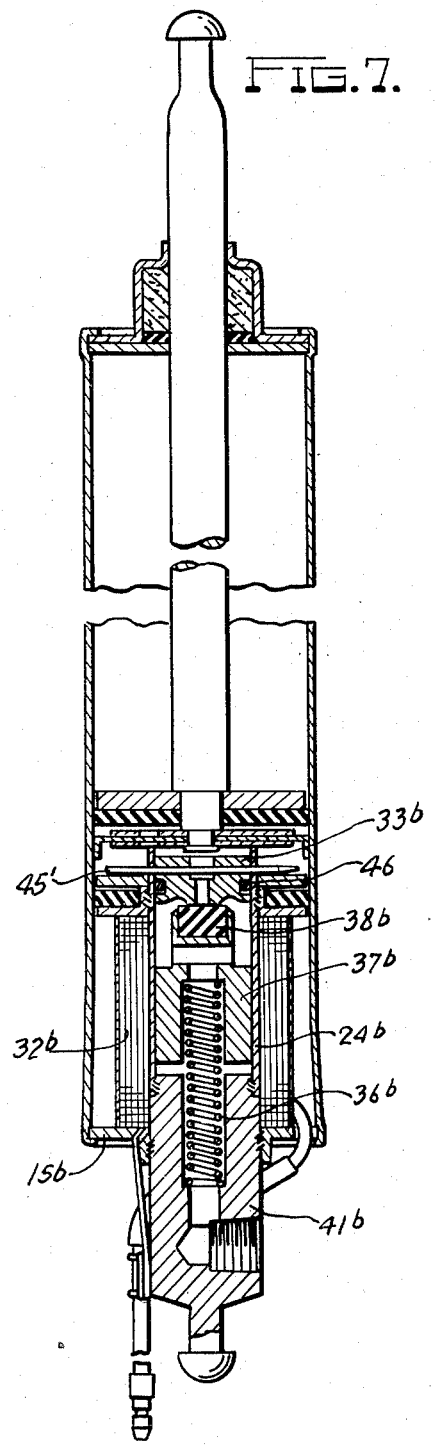
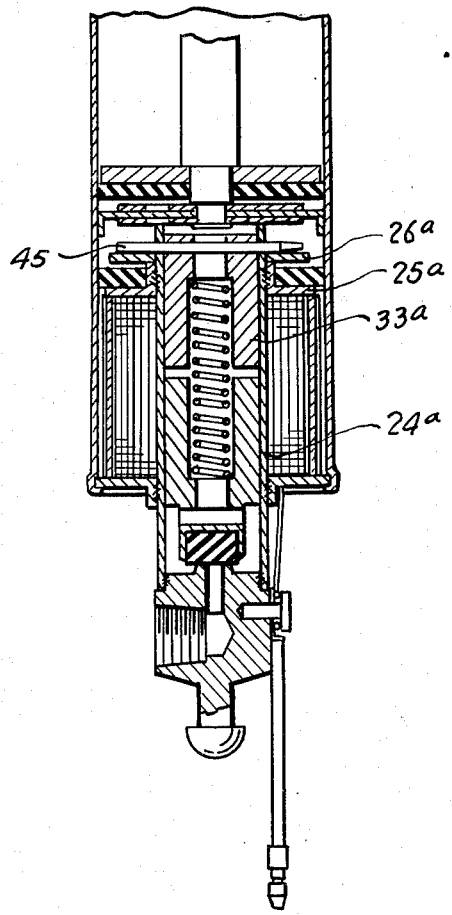
INVENTOR.
John B. Parsons
BY
ATTORNEY

Patented May 12, 1953

2,638,125

UNITED STATES PATENT OFFICE 2,638,125

ELECTROMAGNETICALLY ACTUATED VALVE

John B. Parsons, Maumee, Ohio

Application July 17, 1950, Serial No. 174,282

1 Claim. (Cl. 137—729)

This invention relates to a solenoid controlled valve unit and constitutes an improvement on my Patent 2,479,398, dated August 16, 1949.

An object is to produce an assembly of the above character in which a more reliable and efficient seal is achieved between the cylinder or housing and the solenoid controlled valve unit and in which provision is made for militating against injury to the solenoid winding during the assembly operation and to utilize a sleeve which may be of ferrous or non-ferrous metal and which is assembled and associated with other parts in a new and improved manner.

Another object is to produce a simple and efficient solenoid controlled valve unit assembly having the new and improved features of arrangement, of assembly and of structure hereinafter described, enabling the structure to be produced economically on a production basis and substantially prolonging its useful life.

Other objects and advantages of the invention will hereinafter appear, and for purposes of illustration but not of limitation, embodiments of the invention are shown in the accompanying drawings, in which:

Figure 1 is a longitudinal sectional elevation of a piston and cylinder assembly embodying a solenoid controlled valve;

Figure 2 is a longitudinal sectional elevation of the tube or sleeve, end fitting for same, and washer-like members rigidly secured to the outside of the sleeve;

Figure 3 is a fragmentary lower end elevation of the assembly taken substantially on the line 3—3 of Figure 1;

Figure 4 is a top perspective view of the plug fitting the upper or inner end of the sleeve;

Figure 5 is a bottom end elevation of the assembly shown on Figure 1;

Figure 6 is a fragmentary longitudinal section of a piston and cylinder assembly having a solenoid controlled valve unit and showing a modified form; and Figure 7 is a longitudinal sectional view of a piston and cylinder assembly with a solenoid controlled valve unit therein and in which the valve seats in a reverse manner such that pressure within the cylinder exceeding a predetermined maximum is able to unseat the valve. Thus the valve serves as a pressure release.

The illustrated embodiment of the invention comprises an elongate metallic cylinder 10 of relatively thin-walled structure having end portions 11 and 12 of slightly greater diameter for the reception of closures secured therein by crimping the metal ends over abutting annular edge portions of an apertured disc 13, and a flanged cup-shaped member 14 forming the upper closure and an apertured closure disc 15 forming the bottom closure, the latter being notched for wire clearance as will hereinafter appear. The disc 13 which seats against the upper shoulder 16 is apertured at its center 13a to afford sliding movement of a piston rod 17. A sleeve 18 of felt-like packing material bears tightly against the enclosed portion of the piston rod 17, a rubber washer 19 being interposed between the lower end of the sleeve 18 and the disc 13. This arrangement enables the venting of air from the inside of the cylinder 10 but militates against the ingress of air from the outside to the cylinder, and such structure and arrangement is more fully shown, described and claimed in my co-pending application Serial No. 36,977, filed July 3, 1948, and entitled "Sealing Device for Piston and Cylinder Assemblies."

Attached to the inner end of the piston rod 17 is a piston 20 and arranged within the cylinder 10 and below the piston 20 is a solenoid controlled valve unit 21, the same having a connecting lead 22 and a grounding lead 23. The unit 21 includes an elongate tube or sleeve 24 which is relatively thin-walled and may be of steel or a suiable non-ferrous metal such as brass. The sleeve 24 has a portion extending well inside of the cylinder 10 and another portion extending outside of the cylinder.

Mounted on the sleeve 24 adjacent the inner end are washer-like members 25 and 26, the member 25 being of slightly less diameter than the diameter of the cylinder 10 and the member 26 being of substantially less diameter than that of the member 25. The washer-like member 25 has an inwardly extending integral flange 27 which bears against the outside of the sleeve 24 and is secured thereto, in a leak-proof or fluid tight manner as well as rigidly, by hydrogen brazing. The member 26 abuts against the inner end of the flange 27 and in the form shown is likewise rigidly fixed by brazing to the sleeve 24. The space between the washer-like members 25 and 26 receives a rubber-like washer 28 which bears against the outer surface of the flange 27 and in liquid sealing contact with the inner wall of the cylinder 10. The reduced diameter of the washer-like member 26 enables the rubber washer 28 to be stretched over it and snapped into the space between these two members. This simplifies the asembly of these parts.

Spaced from the flanged washer member 25 and as above mentioned, forming the lower end closure for the cylinder 10 is the washer-like member 15 which is provided with an integral flange 29 extending outwardly relative to the cylinder 10, such flange also being rigidly secured to the sleeve 24 as by hydrogen brazing. The member 15 has a notch 30 to accommodate the lead 22 and an aperture 31 through which the ground lead 23 extends. Interposed between the washer-like members 25 and 15 are solenoid windings 32. Manifestly, by rigidly securing the members 15 and 25 to the sleeve, the liability of the windings being crushed or otherwise damaged by forcing one of these members toward the other during the assembly operation, is eliminated.

Having a press fit in the upper or inner end portion of the sleeve 24 is an externally knurled plug 33 which has a shouldered passage 34 extending therethrough. The sleeve 33 is slightly tapered, the lower end being of slightly less diameter to facilitate the pressing of the plug within the sleeve. The knurl of the plug assists in retaining it inside of the sleeve.

Seated within the plug 33 is a helically coiled spring 36, the opposite end of which bears against a reciprocable tubular valve member 37 formed with a crimped-in rubber sealing nose 38 which is adapted to close a small port 39 leading from a lateral liquid passage 40 formed in a fitting 41 which may be hydrogen brazed to the outwardly projecting end portion of the sleeve 24, thus to provide a rigid, fluid-tight joint with the sleeve.

In operation, when the solenoid is energized, the reciprocable or slidable valve member 37 is drawn upwardly, further compressing the spring and withdrawing the rubber nose 38 from the port 39 permitting the passage of liquid into or from the cylinder, either admitting liquid under pressure for forcing the piston upwardly or to enable the piston to move downwardly for forcing liquid from the cylinder.

As to the purpose of the above described piston and cylinder assembly, the same is particularly adapted for use in connection with hydraulically operated vehicle window regulators and the like. In such instances, the piston rod 17 may be connected through suitable linkage to the lower edge portion of the window panel. The tube, a portion of which is shown connected to the liquid passage 40 in the fitting 41, leads to an electric motor driven pump (not shown). When such motor is energized, liquid is forced from a reservoir (not shown), past the valve 38, the solenoid 32 having been simultaneously energized to unseat the valve, compressing the coil spring 36. Thus liquid under pressure is introduced to the cylinder 10 to force the piston 20 in an upward direction. On the other hand, when it is desired to lower the vehicle window, for example, a coil spring (not shown) and which forms a part of the regulator mechanism and which has been placed under tension during the raising of the window, pulls the window downwardly. At that time, the solenoid 32 alone is energized, unseating the valve 38 and the piston 20 forces the liquid from the cylinder back to its reservoir to be available for the next operation.

In order to fully understand this operation, it should be mentioned that associated with the motor driven pump is a valve (not shown) which when the motor operates, is unseated to allow liquid flow but when pump stops, the valve is so positioned as to enable liquid from the cylinder to pass into the reservoir.

Figure 6 illustrates a modified form in which the ported plug 33a is retained in position by a pin 45 which extends through the walls of the elongate sleeve 24a as well as the plug 33a with end portions extending on opposite sides of the sleeve to serve as a stop for retaining the washer-like member 26a from coming loose. In this instance, the washer 26a embraces the sleeve 24a, and, as shown, is hydrogen brazed to the sleeve to secure a fluid-tight joint.

From the above description, it will be apparent that the sealing washer 28 can be readily applied into position of the use and its position maintained with respect to the adjacent washers. The use of a steel sleeve, for example, is important in that it militates against electrolysis within the cylinder which heretofore has been found to be objectionable in the case of a die cast sleeve, for example, because within a relatively short period of time, the inner end of the sleeve disintegrates or becomes so weakened as to interfere with the efficient operation of the assembly. The novel manner in which the fitting is applied facilitates assembly and enables, more readily, access to the parts for inspection or the like.

The form of the invention shown on Figure 7 somewhat resembles that of Figure 6 except in this instance the valve 37b having a rubber sealing nose 38b is urged upwardly by a coil spring 36b against a seat on a ported plug 33b which is held in place by a pin 45' passing through the walls of an elongate sleeve 24b and the plug 33b. The plug 33b has a peripheral groove in which fits a rubber O ring 46 to provide a fluid-tight seal between the plug and the inner walls of the sleeve 24b. The opposite end of the coil spring 36b seats in a socket in a fitting 41b which extends inside of the cylinder, receives a portion of the solenoid coil 32b and the flange of the washer-like member 15b. The inner end of the fitting 41b is shouldered to receive the sleeve 24b.

The above arrangement is such that when the fluid pressure within the cylinder exceeds a predetermined maximum as determined by the coil spring 36b, it will force the rubber nose 38b away from its seat, thereby to relieve the pressure from the inside of the cylinder. Thus the valve serves as a pressure release valve as well as a valve to control the ingress of liquid to and from the cylinder.

It is to be understood that numerous changes in details of construction, arrangement and operation may be effected without departure from the spirit of the invention especially as defined in the appended claim.

What I claim is:

A device of the class described comprising a housing, a solenoid controlled valve assembly within the housing including a unitary device having an elongate sleeve of substantially less diameter than the housing, a pair of washer-like members embracing the inner end portion of the sleeve, an integral flange on the outer washer-like member embracing the sleeve and against which the other member abuts thereby positively to space one member from the other, a fluid tight welded connection between said flange and said sleeve, a rubber-like sealing means between said washer-like members in sealing engagement with the walls of the housing means to retain the inner washer-like member on the sleeve and against said flange, a third washer-like member embracing said sleeve and closing the adjacent end of said housing, an integral flange on said third member embracing the sleeve, a solenoid coil on said sleeve and interposed between said first flanged washer-like member and said third member, a spring tensioned reciprocable valve within said sleeve, a ported fitting secured to the outer end of said sleeve, and a rigid fluid tight welded connection between said sleeve and fitting.

JOHN B. PARSONS.

References Cited in the file of this patent

UNITED STATES PATENTS

| Number | Name | Date |
|---|---|---|
| 374,088 | Roosevelt | Nov. 29, 1887 |
| 2,279,243 | Parsons | Apr. 7, 1942 |
| 2,301,576 | Parsons | Nov. 10, 1942 |
| 2,468,943 | Parsons | May 3, 1949 |
| 2,479,398 | Parsons | Aug. 16, 1949 |